United States Patent [19]

Zampini

[11] Patent Number: 4,647,297

[45] Date of Patent: Mar. 3, 1987

[54] BENZYL SUBSTITUTED PHENYLENE OXIDE MEMBRANE

[75] Inventor: Anthony Zampini, St. Louis, Mo.

[73] Assignee: Monsanto Company, St. Louis, Mo.

[21] Appl. No.: 509,698

[22] Filed: Jun. 30, 1983

[51] Int. Cl.$^4$ ............................................. B01D 53/22
[52] U.S. Cl. .......................................... 55/158; 55/16
[58] Field of Search ............................ 55/16, 68, 158; 210/500.2

[56] References Cited

U.S. PATENT DOCUMENTS

| | | | |
|---|---|---|---|
| 3,226,361 | 12/1965 | Borman | 260/47 |
| 3,269,892 | 7/1966 | Hay | 260/2.2 |
| 3,350,844 | 11/1967 | Robb | 55/16 |
| 3,375,298 | 3/1968 | Fox | 260/830 |
| 3,417,053 | 12/1968 | Chalk | 260/47 |
| 3,709,774 | 1/1973 | Kimura | 55/16 X |
| 3,735,559 | 5/1973 | Salemme | 55/16 |
| 3,762,136 | 10/1973 | Kimura | 55/158 |
| 3,852,388 | 12/1974 | Kimura | 55/16 X |
| 4,230,463 | 10/1980 | Henis et al. | 55/16 |
| 4,427,419 | 1/1984 | Li | 55/68 X |

Primary Examiner—Robert Spitzer
Attorney, Agent, or Firm—H. Croskell

[57] ABSTRACT

A gas separation membrane made from a benzyl-substituted polymer of 2,6-dimethyl-1,3-phenylene oxide having the structure

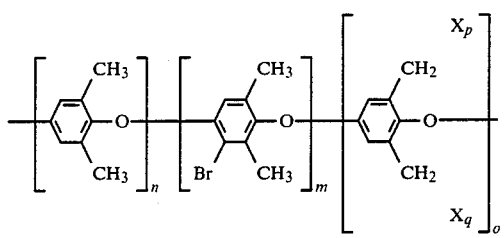

wherein the benzyl substituent, X, is selected from the group consisting of

—CN
—SCN

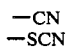

—OR$_1$,

—O—C—R$_1$,
         ‖
         O

—NR$_1$R$_2$,
—SR$_1$

-continued

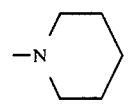

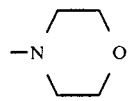

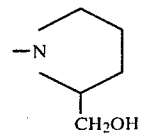

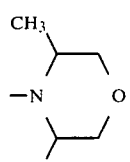

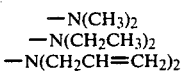

—N(CH$_3$)$_2$
—N(CH$_2$CH$_3$)$_2$
—N(CH$_2$CH=CH$_2$)$_2$

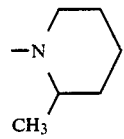

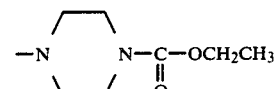

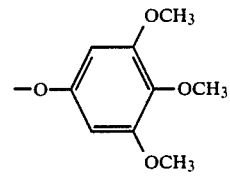

—O—CH$_2$CF$_2$CF$_2$CF$_3$
—SCH$_2$CH$_3$

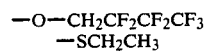

—OH where R$_1$ and R$_2$ are hydrogen, an alkyl, phenyl or a substituted phenyl or substituted alkyl of 1-6 carbon atoms where the substituent is phenyl, a nitro group, an alkoxy a phenoxy group, sulfide, sulfoxide, a carboxylic acid group or an alcohol, m is 0-0.99, n is 0-0.99 and o is 0.01-99, with m, n and o being decimal portions of a polymeric unit and the sum of m, n and o being 1, p is 1 and q is 0 or 1. Expressed in percentages of a polymeric unit, m is 0-99 percent, n is 0-99 percent and o is 1 to 99 percent. Preferably, m and n are at least 0.01.

23 Claims, No Drawings

BENZYL SUBSTITUTED PHENYLENE OXIDE MEMBRANE

BACKGROUND OF THE INVENTION

A. Field of the Invention

This invention relates to fluid separation membranes made from benzyl substituted phenylene oxide polymers.

B. Prior Art

Polyarylene oxides have been recognized as material of some potential in the membrane separation field. For instance, Robb in U.S. Pat. No. 3,350,844 discloses that polyarylene oxide membranes, for instance membranes of 2,6-dimethylphenylene oxide membranes, have unique properties such as a high separation factor and flux together with strength and ability to form thin films. Robb further discloses that factors such as temperature, pressure, elongation of oriented membrane material, the amount of crystallinity, among others, in the polyarylene oxide resin, may effect permeability.

In this regard polyphenylene oxide resins have a low resistance to most common organic solvents. Aromatic and chlorinated hydrocarbon solvents dissolve polyphenylene oxide polymers, while other solvents and solvent vapors induce crazing in molded polyphenylene oxide parts under stress to cause a substantial loss of strength in the part.

See also Kimura, U.S. Pat. Nos. 3,709,774; 3,762,136; and 3,852,388 which relate to membranes of polyxylylene oxide with the same apparent disadvantages. In this regard, Kimura discloses dry asymmetric membranes comprising a porous layer of interconnected crystals of a polyarylene oxide. The membranes are in the form of films cast from a polymer solution.

An alternative form of polyarylene oxide membranes is disclosed by Salemme in U.S. Pat. No. 3,735,559 where various ionic forms of a sulfonated polyxylylene oxide membrane are disclosed. Among the disadvantages discussed are that it is necessary to preshrink such membranes to avoid rupturing; the hydrogen ion form is unstable and may undergo sulfone formation resulting in crosslinking or may, in the presence of water, undergo hydrolysis with the liberation of sulfuric acid; various counter ion salt forms of the membrane are stable and will avoid detrimental crosslinking but such membranes may densify in the presence of water.

Henis et. al. in U.S. Pat. No. 4,230,463 discloses multicomponent membranes for gas separations which comprises a coating in contact with a porous separation membrane where the separation properties of the multicomponent membranes are principally determined by the porous separation membrane as opposed to the material of the coating. Henis et. al. in Examples 59–61 discloses such multicomponent membranes where the porous separation membrane comprised brominated poly(xylylene oxide) polymer where the bromination is essentially upon methyl groups. The membranes are in hollow fiber form. Such brominated poly(xylylene oxide) polymer is disadvantageous in that the polymer exhibits intrinsic permeability significantly lower than the intrinsic permeability of the precursor polymer, poly(xylylene oxide) also known as poly(2,6-dimethyl-1,4-phenylene oxide).

In summary, suitable polyarylene oxide membranes have not been provided in hollow fiber form which can exhibit sufficient flux and selectivity of separation for general commercial gas separation operations in the presence of adverse environmental conditions such as the presence of chemical contaminants, extremes of differential pressure and temperature.

SUMMARY OF THE INVENTION

A gas separation membrane made from a benzyl-substituted polymer of poly(2,6-dimethyl-1,4-phenylene oxide) having the structure

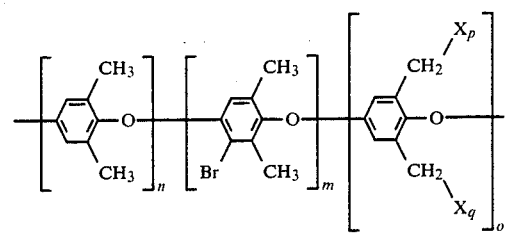

wherein the benzyl substituent, X, is selected from the group consisting of

—CN
—SCN

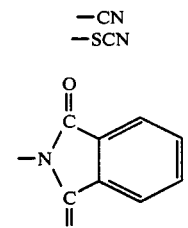

—OR$_1$,

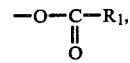

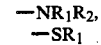—NR$_1$R$_2$,
—SR$_1$

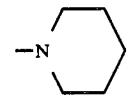

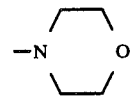

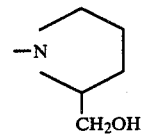

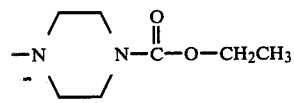

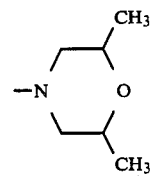

-continued

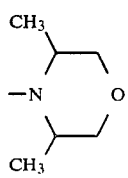

—N(CH₃)₂
—N(CH₂CH₃)₂
—N(CH₂CH=CH₂)₂

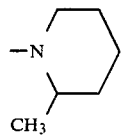

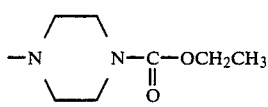

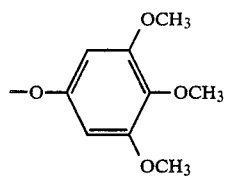

—O—CH₂CF₂CF₂CF₃
—SCH₂CH₃

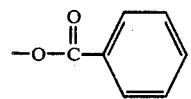

—OH where R₁ and R₂ are hydrogen, an alkyl, phenyl or a substituted phenyl or substituted alkyl of 1–6 carbon atoms where the substituent is phenyl, a nitro group, an alkoxy a phenoxy group, sulfide, sulfone, a carboxylic acid group or an alcohol, m is 0–0.99, n is 0–0.99 and o is 0.01–99, with m, n and o being decimal portions of a polymeric unit and the sum of m, n and o being 1, p is 1 and q is 0 or 1. Expressed in percentages of a polymeric unit, m is 0–99 percent, n is 0–99 percent and o is 1 to 99 percent. Preferably, m and n are at least 0.01.

DETAILED DESCRIPTION OF THE INVENTION

This invention provides gas separation membranes made from a benzyl substituted polyarylene oxide polymer and more specifically substituted poly(2,6-dimethyl-1,4-phenylene oxide), which has the structure

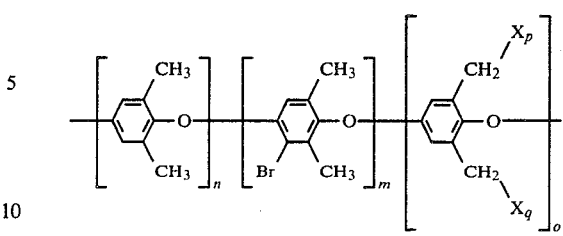

where the benzyl-substituent, $X_p$ and $X_q$, is selected from the group of monovalent radicals consisting of

—CN
—SCN

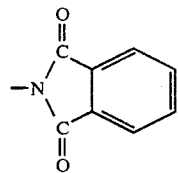

—OR₁,

—O—C—R₁,
     ‖
     O

—NR₁R₂,
—SR₁

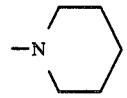

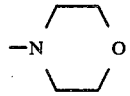

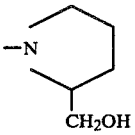

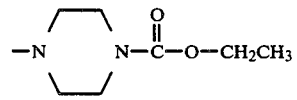

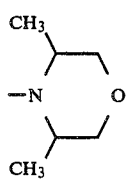

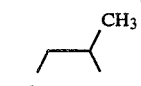

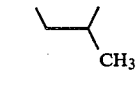

—N(CH₃)₂

-continued
—N(CH₂CH₃)₂
—N(CH₂CH=CH₂)₂

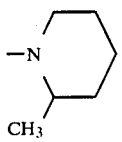

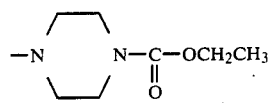

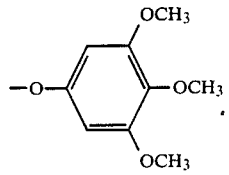

—O—CH₂CF₂CF₂CF₃
—SCH₂CH₃

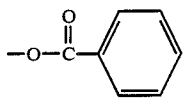

—OH where $R_1$ and $R_2$ are hydrogen, an alkyl, phenyl or a substituted phenyl or substituted alkyl of 1-6 carbon atoms where the substituent is phenyl, a nitro group, an alkoxy a phenoxy group, sulfide, sulfone, a carboxylic acid group or an alcohol, m is 0-0.99, n is 0-0.99 and o is 0.01-99, with m, n and o being decimal portions of a polymeric unit and the sum of m, n and o being 1, p is 1 and q is 0 or 1. Expressed in percentages of a polymeric unit, m is 0-99 percent, n is 0-99 percent and o is 1 to 99 percent. Preferably, m and n are at least 0.01.

It has been found that a membrane made from the polymeric material described herein has, for most cases, improved selectivity and superior processability which more than offsets any permeability reductions. Improved processability permits for the spinning of hollow fiber separation membranes which are highly desirable for commercial utilization.

In the case of conventional membranes, a gain in permeability for one gas usually results in an equal or greater loss in selectivity or separation factor, such that little or no beneficial results are achieved by attempting to increase the permeability of the membrane.

EXAMPLES

Polymers of substituted poly(2,4-dimethyl-1,4-phenylene oxide) were prepared to contain varying amounts of aryl-substituted bromine and the benzyl-substituted monovalent radicals of this invention. The polymers were dissolved in a suitable solvent and membranes in the form of films were cast from the polymer solution. The solvent was then removed from the films and the films dried.

Conventional tests were then made on the dried films to determine the permeabilities of hydrogen, oxygen, carbon monoxide, carbon dioxide and methane with respect to the films. From these permeabilities, separation factors for various pairs of the gases were determined. The results are shown in Table I.

TABLE 1

| Example | Polymer Composition X | % m | % O | $P_{H_2} \times 10$ | $P_{O_2}$ | $P_{CO_2}$ | $\alpha H_2/CH_4$ | $\alpha H_2/CO$ | $\alpha O_2/N_2$ | $\alpha CO_2/CH_4$ |
|---|---|---|---|---|---|---|---|---|---|---|
| 1 | —CN | 10 | 58 | 38 | 4.1 | 17 | 43 | — | 5.7 | 23 |
| 2 | —SCN | 10 | 58 | 11 | 1.1 | 3.9 | 41 | — | 5.8 | 17 |
| 3 | —OCH₃ | 13 | 63 | 34 | 4.1 | 26 | 36 | — | 5.0 | 30 |
| 4 | —OCOCH₃ | 10 | 58 | 17 | 1.8 | 9.2 | 37 | — | 5.1 | 23 |
| 5 | —NH—C(CH₃)₃ | 15 | 57 | 52 | 8.2 | 43 | 15 | 18 | 5.1 | 18 |
| 6 | 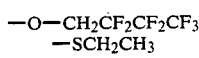 | 19 | 56 | 23 | 2.2 | 11 | 59 | 32 | 5.7 | 27 |
| 7 | (trimethoxyphenoxy) | 10 | 58 | 6.4 | — | 3.2 | 51 | — | — | 31 |
| 8 | —O—CH₂CF₂CF₂CF₃ | 10 | 58 | 43 | 11 | 54 | 11 | — | 3.5 | 16 |
| 9 |  | 13 | 63 | 32 | — | — | — | 19 | — | — |

TABLE 1-continued

| Example | X | % m | % O | $P_{H_2} \times 10$ | $P_{O_2}$ | $P_{CO_2}$ | $\alpha H_2/CH_4$ | $\alpha H_2/CO$ | $\alpha O_2/N_2$ | $\alpha CO_2/CH_4$ |
|---|---|---|---|---|---|---|---|---|---|---|
| 10 | —N(morpholine ring) | 13 | 63 | 17 | — | — | — | 22 | — | — |
| 11 | —N(pyrrolidine-CH$_2$OH) | 13 | 63 | 17 | — | — | — | 30 | — | — |
| 12 | —N(piperazine-N—C(=O)—OCH$_2$CH$_2$) | 13 | 63 | 26 | — | — | — | 32 | — | — |
| 13 | —N(2,6-dimethylmorpholine) | 13 | 63 | 37 | — | — | — | 34 | — | — |
| 14 | —N(CH$_3$)$_2$ | 10 | 37 | 42 | — | — | — | 20 | — | — |
| 15 | —N(CH$_2$CH$_3$)$_2$ | 10 | 37 | 40 | — | — | — | 13 | — | — |
| 16 | —N(CH$_2$CH=CH$_2$)$_2$ | 10 | 37 | 24 | — | — | — | 18 | — | — |
| 17 | —N(piperidine) | 10 | 37 | 41 | — | — | — | 20 | — | — |
| 18 | —N(2-methylpiperidine) | 10 | 37 | 33 | — | — | — | 32 | — | — |
| 19 | —N(morpholine) | 10 | 37 | 37 | — | — | — | 22 | — | — |
| 20 | —N(2,6-dimethylmorpholine) | 10 | 37 | 26 | — | — | — | 28 | — | — |
| 21 | —SCH$_2$CH$_3$ | 10 | 58 | 11 | — | — | 21 | — | — | — |
| 22 | F | 10 | 58 | 59 | 7.9 | 38 | 35 | — | 4.8 | 24 |
| 23 | OH | 10 | 58 | 35 | 5.2 | 33 | 25 | — | 4.4 | 24 |
| 24 | Cl | 10 | 58 | 34 | 4.1 | 15 | 37 | — | 5.0 | 17 |

I claim:
1. A membrane for separating fluids, said membrane being made from a polymer having the structure

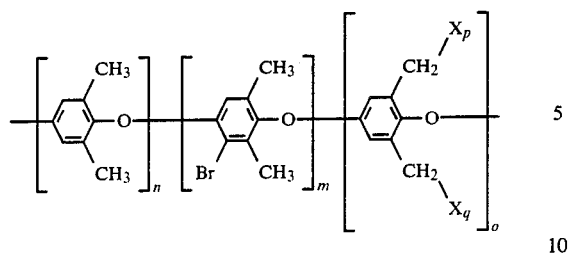

where X is a substituent selected from the group consisting of

—CN
—SCN

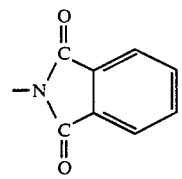

—OR₁
—O—C—R₁
—NR₁R₂
—SR₁

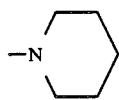

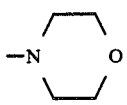

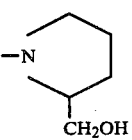

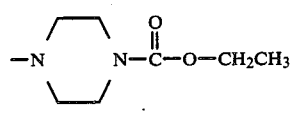

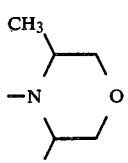

—N(CH₃)₂
—N(CH₂CH₃)₂
—N(CH₂CH=CH₂)₂

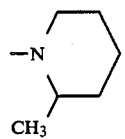

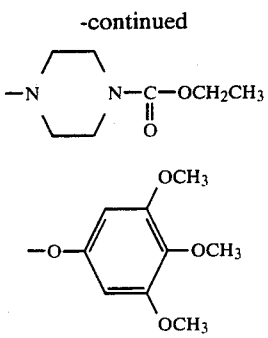

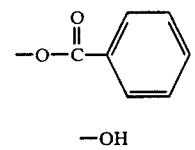

—O—CH₂CF₂CF₂CF₃
—SCH₂CH₃

—OH and where m, n and o are decimal portions of the polymeric unit and the sum of m, n and o is 1, m is 0 to 0.99, n is 0 to 0.99 and o is 0.01 to 1, p is 1 and q is 0 or 1 when q is 0, X is hydrogen; and where $R_1$ and $R_2$ are hydrogen, an alkyl, phenyl or a substituted phenyl or substituted alkyl of 1–6 carbon atoms where the substituent is phenyl, a nitro group, a phenoxy group, sulfur, a carboxylic acid group or an alcohol.

2. The membrane of claim 1 wherein m and n are 0.01 to 0.99.

3. The membrane of claim 2 wherein the substituent, x, is selected from the group consisting of

—CN

—SCN

—OCH₃

—OCOCH₃

—NHC(CH₃)₃

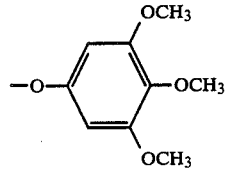

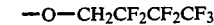

—O—CH₂CF₂CF₂CF₃

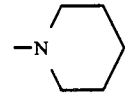

-continued

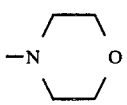

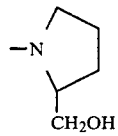

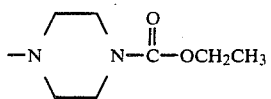

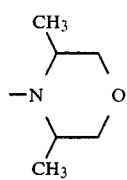

—N(CH₃)₂

—N(CH₂CH₃)₂

—N(CH₂CH=CH₂)₂

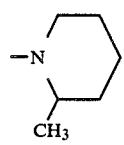

—SCH₂CH₃

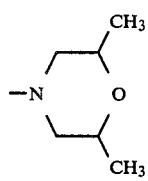

—OH

4. The membrane of claim 3 wherein x is —CN.
5. The membrane of claim 3 wherein x is —SCN.
6. The membrane of claim 3 wherein x is —OCH₃.
7. The membrane of claim 3 wherein x is —OCOCH₃.
8. The membrane of claim 3 wherein x is —NHC(CH₃)₃.
9. The membrane of claim 3 wherein x is

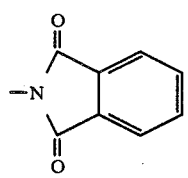

10. The membrane of claim 3 wherein x is

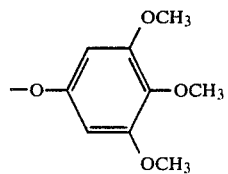

11. The membrane of claim 3 wherein x is —O—CH₂CF₂CF₂CF₃.

12. The membrane of claim 3 wherein x is

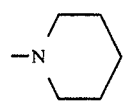

13. The membrane of claim 3 wherein x is

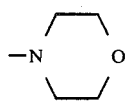

14. The membrane of claim 3 wherein x is

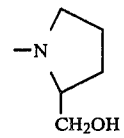

15. The membrane of claim 3 wherein x is

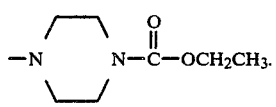

16. The membrane of claim 3 wherein x is

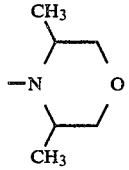

17. The membrane of claim 3 wherein x is —N(CH₃)2.
18. The membrane of claim 3 wherein x is —N(CH₂CH₃)₂.
19. The membrane of claim 3 wherein x is —N(CH₂CH=CH₂)₂.
20. The membrane of claim 3 wherein x is

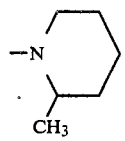

21. The membrane of claim 3 wherein x is

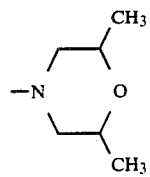
22. The membrane of claim 3 wherein x is —OH.
23. The membrane of claim 3 wherein x is —SCH₂CH₃.
* * * * *